US007363212B2

(12) United States Patent
Erhart et al.

(10) Patent No.: US 7,363,212 B2
(45) Date of Patent: Apr. 22, 2008

(54) METHOD AND APPARATUS FOR TRANSLATING A CLASSIFICATION SYSTEM INTO A TARGET LANGUAGE

(75) Inventors: George W. Erhart, Pataskala, OH (US); Valentine C. Matula, Granville, OH (US); David Skiba, Columbus, OH (US)

(73) Assignee: Avaya Technology Corp., Basking Ridge, NJ (US)

( * ) Notice: Subject to any disclaimer, the term of this patent is extended or adjusted under 35 U.S.C. 154(b) by 798 days.

(21) Appl. No.: 10/815,165

(22) Filed: Mar. 31, 2004

(65) Prior Publication Data

US 2005/0228636 A1    Oct. 13, 2005

(51) Int. Cl.
G06F 17/28    (2006.01)
(52) U.S. Cl. .............................. 704/2; 704/9
(58) Field of Classification Search .................. 704/2, 704/9
See application file for complete search history.

(56) References Cited

U.S. PATENT DOCUMENTS 5,490,061 A * 2/1996 Tolin et al. ................. 704/2
6,910,003 B1 * 6/2005 Arnold et al. .............. 704/4

OTHER PUBLICATIONS

Carpenter et al., "Vector-Based Natural Language Call Routing," Computational Linguistics, vol. 25, Issue 3, pp. 361-388 (1999).
Carpenter et al., "Natural Language Call Routing: A Robust, Self-Organizing Approach," Proceedings of the Fifth International Conference on Spoken Language Processing, pp. 2059-2062 (1998).

* cited by examiner

*Primary Examiner*—Susan McFadden
(74) *Attorney, Agent, or Firm*—Ryan, Mason & Lewis, LLP (57) ABSTRACT

A method and apparatus are provided for translating a classification system in a source language into one or more additional target languages. The classification system employs a sample response repository to learn to classify a communication into one of a plurality of predefined categories. The sample response repository comprises a plurality of prior communications each having a classification. The present invention translates the sample response repository using a mechanical translation process to generate a translated response repository. A natural language understanding process is then applied to the translated response repository to generate a natural language understanding module that can classify a communication in the target language. The natural language understanding process can employ statistical methods or a rule-base of classification rules that determine how communications are classified. A speech recognition statistical model compilation process can optionally be applied to the translated target language response repository to generate a speech recognition module in the target language.

21 Claims, 5 Drawing Sheets

METHOD AND APPARATUS FOR TRANSLATING A CLASSIFICATION SYSTEM INTO A TARGET LANGUAGE

FIELD OF THE INVENTION

The present invention relates generally to methods and systems that classify spoken utterances or text into one of several subject areas, and more particularly, to methods and apparatus for automatically translating such classification systems from a source language into one or more target languages.

BACKGROUND OF THE INVENTION

Many companies employ contact centers to exchange information with customers, typically as part of their Customer Relationship Management (CRM) programs. Automated systems, such as interactive voice response (IVR) systems, are often used to provide customers with information in the form of recorded messages and to obtain information from customers using keypad or voice responses to recorded queries.

When a customer contacts a company, a classification system is often employed to classify spoken utterances or text received from the customer into one of several subject areas or classes. In the case of spoken utterances, the classification system will typically first convert the speech to text using a speech recognition engine. Once the communication is classified into a particular subject area, the communication can be routed to an appropriate call center agent or response team, as appropriate. For example, a telephone inquiry may be automatically routed to a given call center agent based on the expertise, skills or capabilities of the agent.

A company must employ a different classification system for each language supported by the contact center. The process of generating a unique classification system for each supported language is typically significant, especially where the number of potential questions and possible answers associated with each call is large. Thus, a need exists for improved techniques for generating a classification system in several desired languages. A further need exists for a method and apparatus for automatically translating a classification system in a first source language into one or more additional target languages.

SUMMARY OF THE INVENTION

Generally, a method and apparatus are provided for automatically translating a classification system in a first source language into one or more additional target languages. The classification system employs a sample response repository to learn to classify a communication into one of a plurality of predefined categories. The sample response repository comprises a plurality of prior communications each having a classification. The present invention translates the sample response repository using a mechanical translation process to generate a translated response repository. A natural language understanding process is then applied to the translated response repository to generate a natural language understanding module that can classify a communication in the target language.

The natural language understanding process can employ statistical methods or a rule-base of classification rules that determine how communications are classified. In a rule-based implementation, the rule-base is also translated using a mechanical translation process to generate a rule-base in the target language. In implementations where spoken words must be converted to text for processing by the classification system, a speech recognition statistical model compilation process is applied to the translated target language response repository to generate a speech recognition module in the target language.

A more complete understanding of the present invention, as well as further features and advantages of the present invention, will be obtained by reference to the following detailed description and drawings.

DETAILED DESCRIPTION

Figure 1:
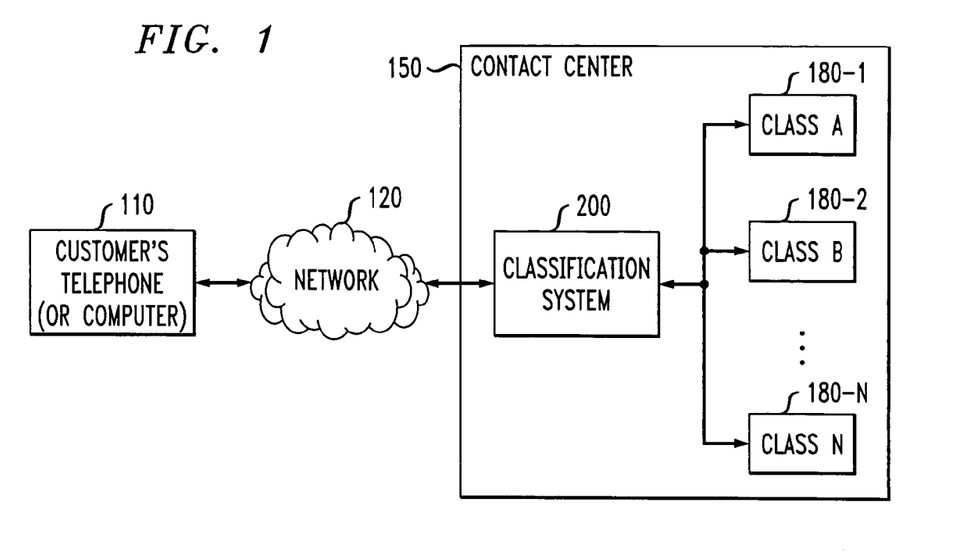
FIG. 1 illustrates a network environment in which the present invention can operate.

FIG. 1 illustrates a network environment in which the present invention can operate. As shown in FIG. 1, a customer, employing a telephone 110 or computing device (not shown), contacts a contact center 150, such as a call center operated by a company. The contact center 150 includes a classification system 200, discussed further below in conjunction with FIG. 2, that classifies the communication into one of several subject areas or classes 180-A through 180-N (hereinafter, collectively referred to as classes 180). Each class 180 may be associated, for example, with a given call center agent or response team and the communication may then be automatically routed to a given call center agent 180 based on the expertise, skills or capabilities of the agent or team. It is noted that the call center agent or response teams need not be humans. In a further variation, the classification system 200 can classify the communication into an appropriate subject area or class for subsequent action by another person, group or computer process. The network 120 may be embodied as any private or public wired or wireless network, including the Public Switched Telephone Network, Private Branch Exchange switch, Internet, or cellular network, or some combination of the foregoing.

Figure 2:
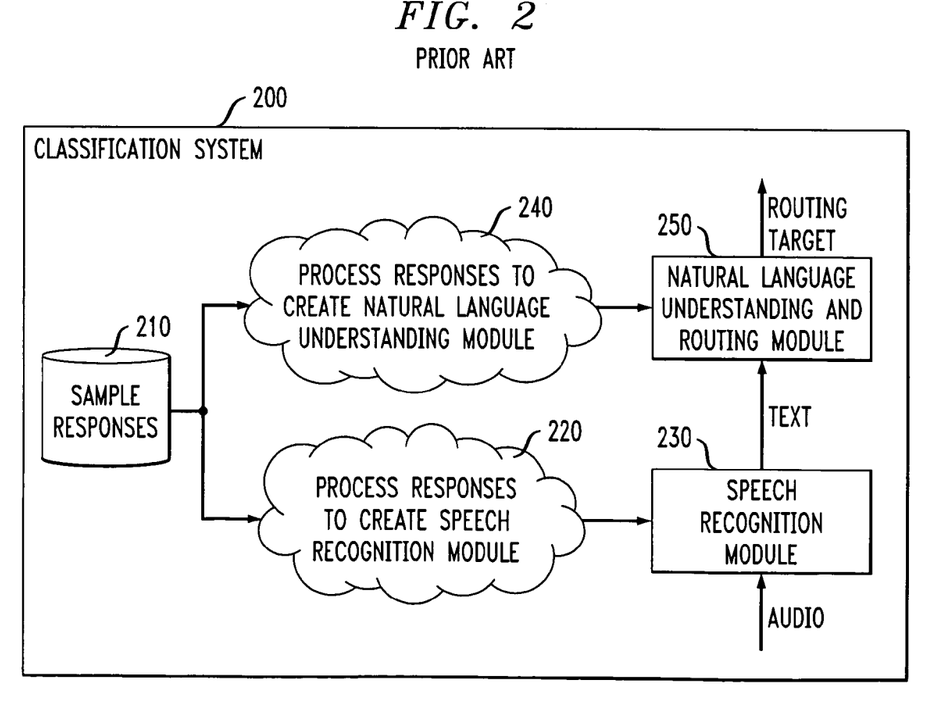
FIG. 2 is a schematic block diagram of a conventional classification system that employs a statistical natural language understanding module.

FIG. 2 is a schematic block diagram of a conventional classification system 200 that employs a statistical natural language understanding module 250. Generally, the classification system 200 classifies spoken utterances or text received from customers into one of several subject areas. As shown in FIG. 2, the classification system 200 includes a sample response repository 210 that stores textual versions of sample responses that have been collected from various callers and previously manually classified into one of several subject areas. In one implementation, the sample response repository 210 is a domain specific collection of possible queries and associated potential answers, such as "How may I help you?" and each of the observed answers.

In an implementation that must process spoken utterances, the textual version of the responses in the sample response repository 210 are optionally processed at stage 220 to build a speech recognition module 230, in a known manner. For a detailed discussion of suitable techniques for building a speech recognition module 230, see, for example, Nuance Speech Recognition System, Version 8.0, Grammar Developer's Guide, Chapter 5: Say Anything: Statistical Language Models and Robust Interpretation," (Nuance Communications, Inc.; 1996-2001), incorporated by reference herein. It is noted that in an implementation that does not require processing of spoken utterances (i.e., in a text only implementation, for example, that processes only email and instant messages), the classification system 200 would not require the processing at stage 220 or the speech recognition module 230.

In addition, the textual versions of the responses in the sample response repository 210 are automatically processed at stage 240 to create a statistical-based natural language understanding module 250. Generally, the classified textual versions of the responses 210 are processed to look for patterns in the classifications that can subsequently be applied to classify new utterances. In one class of statistical-based natural language understanding modules 250, for example, the natural language understanding module 250 generally consists of a root word list comprised of a list of root words and a corresponding likelihood (percentage) that the root word should be routed to a given destination (e.g., a call center agent 180). In other words, for each root word, such as "credit" or "credit card payment," the natural language understanding module 250 indicates the likelihood (typically on a percentage basis) that the root word should be routed to a given destination.

For a detailed discussion of suitable techniques for call routing and building a natural language understanding module 250, see, for example, B. Carpenter and J. Chu-Carroll, "Natural Language Call Routing: a Robust, Self-Organizing Approach," Proc. of the Int'l Conf. on Speech and Language Processing, (1998); J. Chu-Carroll and R. L. Carpenter, "Vector-Based Natural Language Call Routing," Computational Linguistics, vol. 25, no. 3, 361-388 (1999); or V. Matula, "Using NL to Speech-Enable Advocate and Interaction Center", InAAU 2004, Session 624, Mar. 13, 2003, each incorporated by reference herein.

Generally, to train a statistical language model for a speech recognizer 230, the sample response repository 210, a corpus of transcriptions of sample utterances, is required. To train a statistical model employed by the natural language understanding module 250 for classification requires as input the corpus of transcriptions of utterances 210. Each sample in the corpus 210 is "classified" by hand as to the routing destination for the utterance (i.e., if a live agent heard this response to a given question, where would the live agent route the call). The corpus of sample text and classification is analyzed during the training phase to create the internal classifier data structures that characterize the utterances and classes.

As previously indicated, a contact center 150 must provide a different classification system 200 for each language supported by the contact center 150. The process of generating a unique classification system 200 for each supported language is significant, especially in domains where the number of potential questions and possible answers associated with each call is large (repositories on the order of 20,000 entries are not uncommon). Thus, according to one aspect of the invention, a method and apparatus are provided for translating a classification system 200 in a first source language into one or more additional target languages. In particular, one aspect of the invention uses mechanical translation tools, with their inherent limitations, to translate the input utterances or text samples into a parallel corpus in the target language.

The present invention recognizes that the statistical processes (speech recognition and natural language classification processes) described above in conjunction with FIG. 2, can perform well in spite of word ordering errors, additional incorrect vocabularies, and small percentages of misclassifications. The present invention provides a mechanical, low cost mechanism for creating versions of classification applications in new target languages, when the underlying classification technology is based on robust statistical methods. While the mechanical translation process may not be fully accurate, the translated responses 210 are sufficiently accurate to create a natural language understanding module in the target language with sufficient accuracy.

In addition, current speech translation tools, while they may generally translate words or phrases correctly, may (i) provide more than one possible translation for any given phrase, (ii) provide both correctly translated words and phrasing, as well as a number of words that while individually correct are not in the same order when used by a native speaker, or (iii) introduce words that are not correct translations for the input text, given the context of the text (e.g., "What is the floor today?" may mean "What is the material under my feet today?" or it may mean "What is the lowest price seen for this item today?"). Nonetheless, the statistical approach in the natural language understanding module generally allows such variations to be properly classified.

Figure 3:
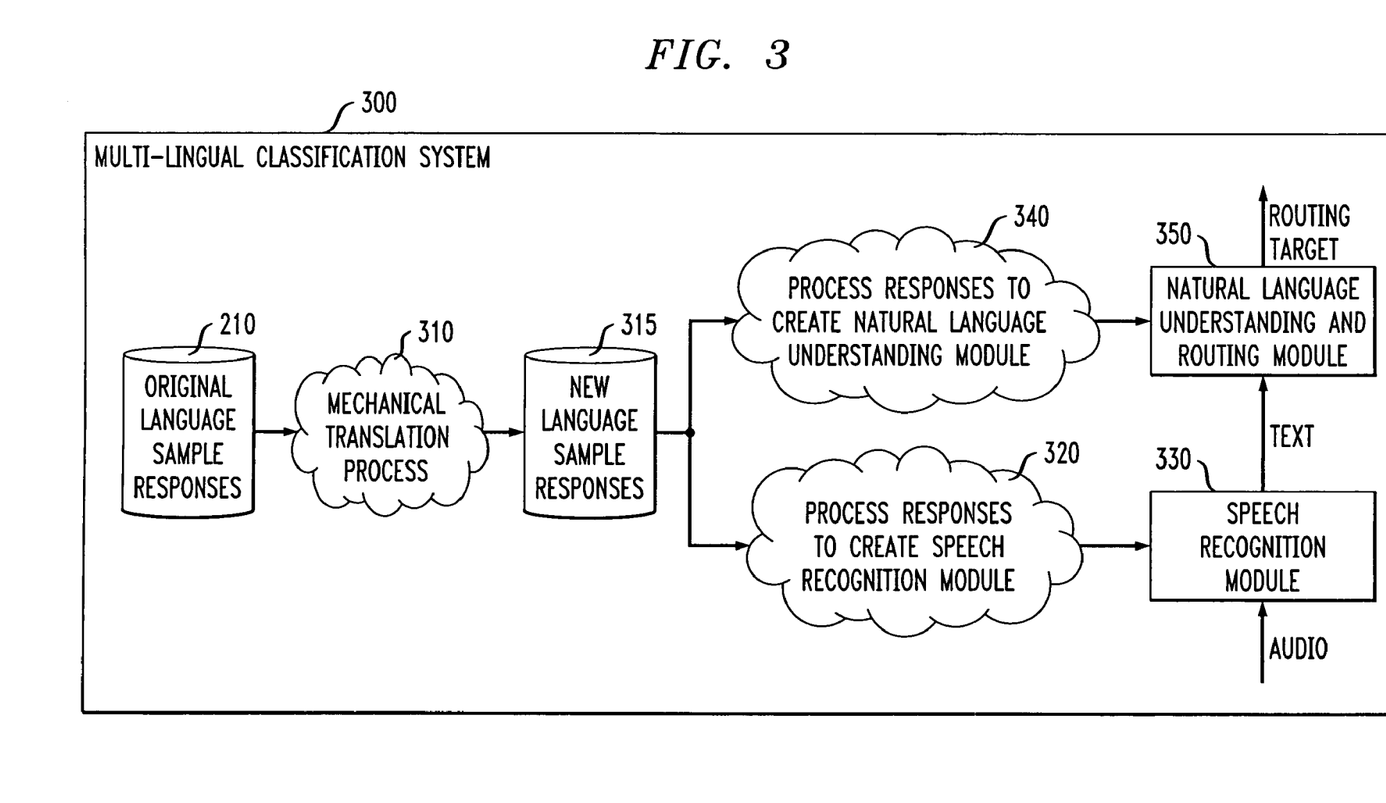
FIG. 3 is a schematic block diagram of a multi-lingual classification system incorporating features of the present invention.

FIG. 3 is a schematic block diagram of a multi-lingual classification system 300 incorporating features of the present invention. The multi-lingual classification system 300 translates a classification system in a first source language, such as the classification system 200 of FIG. 2, into one or more additional target languages. As shown in FIG. 3, the classification system 300 employs a mechanical translation process 310 to translate the original source language corpus (classified textual versions of utterances) 210 into one or more parallel corpuses 315 in additional target languages.

Once the original source language corpus 210 is translated into a parallel corpus 315 in an additional target language, the multi-lingual classification system 300 optionally processes the target language classified responses 315 at stage 320 (in an implementation that must process spoken utterances) to build a speech recognition module 330 in the target language, in a known manner.

In addition, the responses in the target language repository 315 are processed at stage 340 to create a natural language understanding module 350 in the target language. Generally, the classified textual versions of the responses in the target language repository 315 are processed to look for patterns in the classifications that can subsequently be applied to classify new utterances in the target language.

In one variation, manual examination of special-issue word lists (such as stop lists or ignore lists) may be useful in tuning the assistance dictionaries of the mechanical translation process 310, and in tuning the target language models. However, this approach should be much faster and more accurate than mechanical translation methods applied to other recognition or classification methods (such as finite state grammar ASR engines or rule-based classifiers).

The mechanical translation process 310 may be embodied, for example, using the translation technologies of SYSTRAN Software Inc., San Diego, Calif. 92121, USA (www.systransoft.com). Among other benefits, the SYSTRAN translation system provides domain-specific translation libraries. In one variation, the mechanical translation process 310 can be updated to include the same idiomatic expressions employed by the speech recognition module 330.

Figure 4:
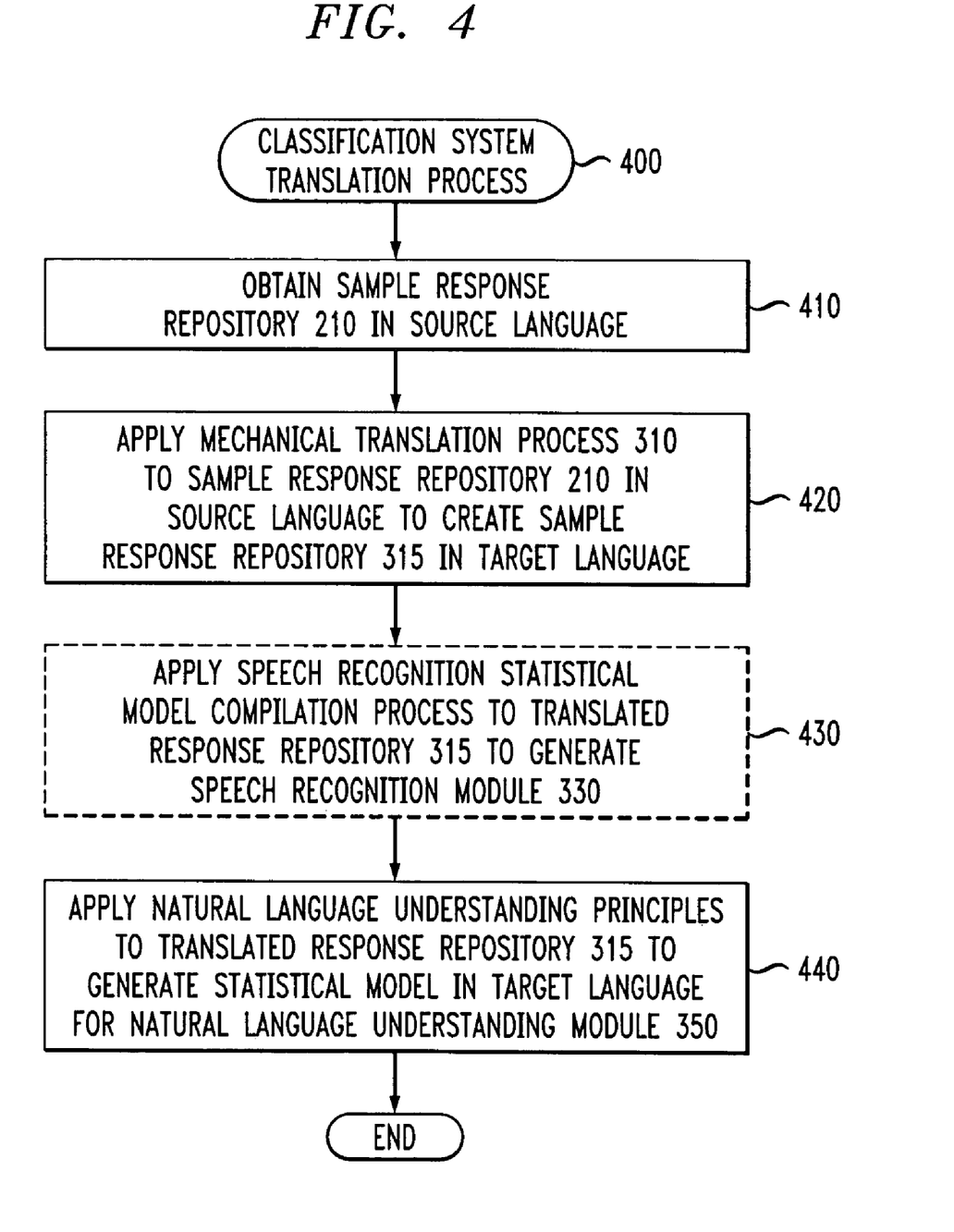
FIG. 4 is a flow chart describing an exemplary implementation of a classification system translation process incorporating features of the present invention.

FIG. 4 is a flow chart describing an exemplary implementation of the classification system translation process 400 incorporating features of the present invention. Generally, the classification system translation process 400 provides multi-lingual versions of a classification system 200, such as a Customer Relationship Management (CRM) Natural Language Call Routing application, once a given language version has been created.

As shown in FIG. 4, the classification system translation process initially obtains the sample response repository 210 in the source language during step 410 and then applies the mechanical translation process 310 to the sample response repository 210 in the source language during step 420. Thereafter, the classification system translation process optionally applies a speech recognition statistical model compilation process to the translated target language response repository 315 during step 430 to generate the speech recognition module 330, if necessary. Finally, the classification system translation process applies natural language understanding principles to the translated response repository 315 during step 440 to generate a statistical model in the target language for the natural language understanding module 350.

Figure 5:
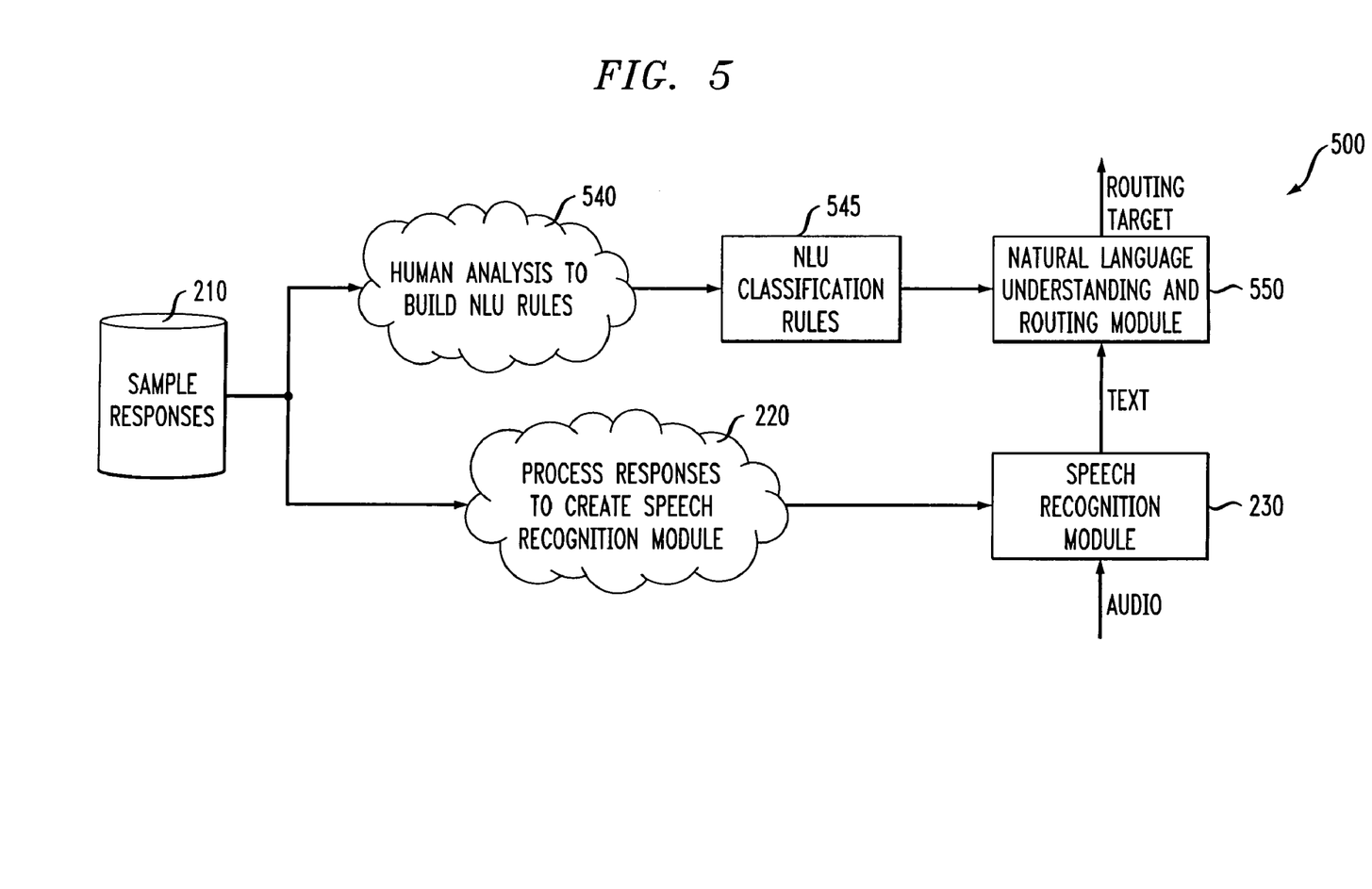
FIG. 5 is a schematic block diagram of a conventional classification system that employs a rule-based natural language understanding module.

FIG. 5 is a schematic block diagram of a conventional classification system 500 that employs a rule-based natural language understanding module 550. The conventional classification system 500 of FIG. 5 is similar to the conventional classification system 200 of FIG. 2, other than the generation of the rule-based natural language understanding module 550.

Thus, as shown in FIG. 5, the classification system 500 includes the same sample response repository 210 that was discussed above in conjunction with FIG. 2. In an implementation that must process spoken utterances, the textual version of the responses in the sample response repository 210 are optionally processed at stage 220 to build a speech recognition module 230, in the same manner as discussed above.

In addition, the textual versions of the responses in the sample response repository 210 are manually processed at stage 540 to create a rule-based natural language understanding module 550. Generally, a person evaluates the textual versions of the responses 210 and writes rules 545 in a known manner, that are generally based on keywords and indicated classifications. For example, a person may create a rule that indicates that if an utterance includes the phrase "credit card" and the word "balance," then the communication should be assigned to a credit card balance class.

Figure 6:
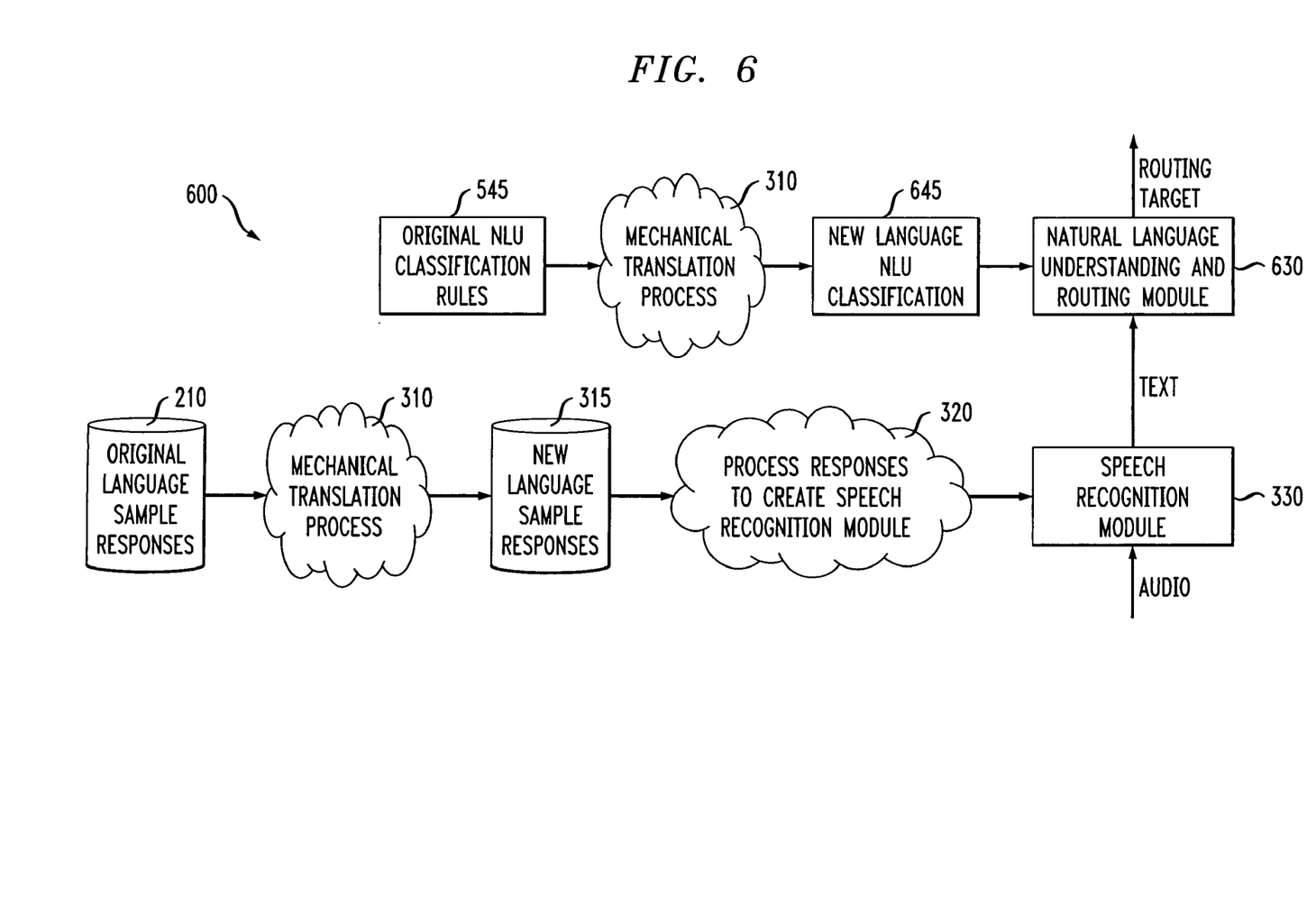
FIG. 6 is a schematic block diagram of a multi-lingual classification system that employs a rule-based natural language understanding module according to the present invention.

FIG. 6 is a schematic block diagram of a multi-lingual classification system 600 that employs a rule-based natural language understanding module according to the present invention. The multi-lingual classification system 600 translates a classification system in a first source language, such as the classification system 500 of FIG. 5, into one or more additional target languages. As shown in FIG. 6, the classification system 600 employs a mechanical translation process 310 to translate the original source language corpus (classified textual versions of utterances) 210 into one or more parallel corpuses 315 in additional target languages, in a manner described above in conjunction with FIG. 3.

Once the original source language corpus 210 is translated into a parallel corpus 315 in an additional target language, the multi-lingual classification system 300 optionally processes the target language classified responses 315 at stage 320 (in an implementation that must process spoken utterances) to build a speech recognition module 330 in the target language, in a known manner, described above in conjunction with FIG. 3.

In addition, according to a further aspect of the present invention, the natural language understanding classification rules 545, manually generated in the manner described above in conjunction with FIG. 5, are also translated by a mechanical translation process 310 to generate natural language understanding classification rules 645 in the target language. Continuing the above example, the mechanical translation process 310 can translate the source language rule that indicates that if an utterance includes the phrase "credit card" and the word "balance," then the communication should be assigned to a credit card balance class, into the target language.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for translating a source language classification system into at least one target language, wherein, said source language classification system classifies a communication into one of a plurality of predefined categories, comprising:
obtaining a sample response repository in said source language, wherein said sample response repository comprises a plurality of prior communications each having a classification;
applying a mechanical translation process to said sample response repository to generate a translated response repository; and
generating a natural language understanding module from said translated response repository, wherein said natural language understanding module classifies a communication in said target language.

2. The method of claim 1, wherein said natural language understanding process employs a statistical method.

3. The method of claim 1, wherein said natural language understanding process employs a rule-base.

4. The method of claim 3, wherein said rule-base defines one or more classification rules that determine how communications are classified.

5. The method of claim 3, further comprising the step of applying a mechanical translation process to said rule-base to generate a rule-base in said target language.

6. The method of claim 1, wherein said communication is a spoken utterance and wherein said method further comprises the step of applying a speech recognition statistical model compilation process to the translated target language response repository to generate a speech recognition module in the target language.

7. The method of claim 6, further comprising the step of applying a speech recognizer to said spoken utterance to convert said spoken utterance to text.

8. The method of claim 1, wherein said classification system routes said communication to one of a plurality of predefined destinations.

9. The method of claim 1, wherein said plurality of predefined categories are a plurality of subject areas.

10. An apparatus for translating a source language classification system into at least one target language, wherein said source language classification system classifies an utterance into one of a plurality of predefined categories, comprising:
a memory; and
at least one processor, coupled to the memory, operative to:
obtain a sample response repository in said source language, wherein said sample response repository comprises a plurality of prior communications each having a classification;
apply a mechanical translation process to said sample response repository to generate a translated response repository; and
generate a natural language understanding module from said translated response repository, wherein said natural language under standing module classifies a communication in said target language.

11. The apparatus of claim 10, wherein said natural language understanding process employs a statistical method.

12. The apparatus of claim 10, wherein said natural language understanding process employs a rule-base.

13. The apparatus of claim 12, wherein said rule-base defines one or more classification rules that determine how communications are classified.

14. The apparatus of claim 12, further comprising the step of applying a mechanical translation process to said rule-base to generate a rule-base in said target language.

15. The apparatus of claim 10, wherein said communication is a spoken utterance and wherein said processor is further configured to apply a speech recognition statistical model compilation process to the translated target language response repository to generate a speech recognition module in the target language.

16. The apparatus of claim 15, wherein said processor is further configured to apply a speech recognizer to said spoken utterance to convert said spoken utterance to text.

17. The apparatus of claim 10, wherein said classification system routes said communication to one of a plurality of predefined destinations.

18. The apparatus of claim 10, wherein said plurality of predefined categories are a plurality of subject areas.

19. An article of manufacture for translating a source language classification system into at least one target language, wherein said source language classification system classifies an utterance into one of a plurality of predefined categories, comprising a machine readable storage medium containing one or more programs which when executed implement the steps of:
obtaining a sample response repository in said source language, wherein said sample response repository comprises a plurality of prior communications each having a classification;
applying a mechanical translation process to said sample response repository to generate a translated response repository; and
generating a natural language understanding module from said translated response repository, wherein said natural language understanding module classifies a communication in said target language.

20. The article of manufacture of claim 19, wherein said classification system routes said communication to one of a plurality of predefined destinations.

21. The article of manufacture of claim 19, wherein said plurality of predefined categories are a plurality of subject areas.

* * * * *

UNITED STATES PATENT AND TRADEMARK OFFICE
CERTIFICATE OF CORRECTION

PATENT NO. : 7,363,212 B2  
APPLICATION NO. : 10/815165  
DATED : April 22, 2008  
INVENTOR(S) : Erhart et al.

Page 1 of 1

It is certified that error appears in the above-identified patent and that said Letters Patent is hereby corrected as shown below:

In claim 1, column 6, line 66, after "wherein" and before "said" eliminate ",".

In claim 10, column 8, line 1, after "language" and before "module" replace "under standing" with --understanding--.

Signed and Sealed this

Sixteenth Day of June, 2009

JOHN DOLL  
*Acting Director of the United States Patent and Trademark Office*